United States Patent [19]

Inoue et al.

[11] 4,039,006
[45] Aug. 2, 1977

[54] CARBON FILAMENT WOUND CYLINDER AND METHOD OF PRODUCING THE SAME

[75] Inventors: Mitsuhiro Inoue; Yo Maeda, both of Shimodate; Satoshi Suzuki, Yuki; Shozo Ohashi; Yoshiharu Nakamura, both of Shimodate, all of Japan

[73] Assignees: Hitachi Chemical Company, Ltd.; Hitachi, Ltd., both of Tokyo, Japan

[21] Appl. No.: 482,405

[22] Filed: June 24, 1974

[30] Foreign Application Priority Data

June 25, 1973   Japan ................... 48-70853

[51] Int. Cl.² .................. F16L 11/00; F16L 9/00
[52] U.S. Cl. ..................... 138/129; 138/177; 138/174; 138/144; 156/173; 428/36; 428/212; 424/377; 428/378; 428/902
[58] Field of Search ............ 428/36, 212, 902, 213, 428/377, 378; 156/173, 184, 190, 195; 138/129, 130, 141, 150, 174, 144, 177

[56] References Cited

U.S. PATENT DOCUMENTS

| 2,594,693 | 4/1952 | Smith | 138/130 |
| 3,490,983 | 1/1970 | Lee | 428/377 |
| 3,700,535 | 10/1972 | McCoy | 156/190 |
| 3,726,751 | 4/1973 | Casadevall | 428/378 |

*Primary Examiner*—George F. Lesmes
*Assistant Examiner*—P. J. Thibodeau
*Attorney, Agent, or Firm*—Burgess, Dinklage & Sprung

[57] ABSTRACT

A carbon filament wound hollow cylinder comprising at least two carbon filament layers, an inner axial direction-wound layer and an outer circumferential direction-wound layer, characterized in that the modulus of longitudinal elasticity in the circumferential direction of the inner layer is lower than that of the outer layer. Such a cylinder is capable of preventing possible crack formation after shaping owing to its much reduced residual stress exerted due to thermal expansion of a mandrel during shaping and capable of being stably employable as a rotary drum for, ultracentrifugation because compressive stress is exerted effectively to cancel tensile stress caused by thermal stress for causing interlaminer delamination during high speed rotation.

1 Claim, 13 Drawing Figures

$E_\theta = 14,000^{kg/mm^2}$ $E_\theta = 800^{kg/mm^2}$

〰️ 10° axial direction-winding (1 ply)

── 90° circumferential direction-winding

CARBON FILAMENT WOUND CYLINDER AND METHOD OF PRODUCING THE SAME

This invention relates to a filament wound hollow body, and more particularly to a carbon filament wound hollow cylinder comprising at least two carbon filament wound layers differing in the winding angle and a method for making the same.

There have heretofore been proposed various filament wound hollow bodies. The filament wound hollow bodies have a wide variety of uses, for example, as a rotary drum of a ultracentrifugalization apparatus for separating $U_{235}$ from $U_{238}$ and so forth. Such rotary drum requires a sufficient strength as well as lightness in weight. With the rotary drums made of conventional filament wound hollow body, however, the sufficient strength can not be obtained. The present invention has been done, in order to obtain a filament wound hollow body or cylinder having an extremely high strength.

When a carbon filament wound cylinder comprising at least two resin-impregnated carbon filament wound layers differing in the winding angle is subjected to the heat-curing treatment, a residual stress is produced due to the thermal expansion of a mandrel, because carbon filaments have a poor interlaminar adhering strength, a very low thermal expansion coefficient and a very high modulus of elasticity, and therefore, delamination is readily caused to occur among wound layers differing in the winding angle.

Essentially according to the present invention, there is provided a carbon filament wound hollow cylinder comprising an inner and an outer carbon filament layer forming a base filament layer laminate, characterized in that the modulus of longitudinal elasticity in the circumferential direction of the inner layer is lower than that of the outer layer. Further according to the present invention, there is provided the cylinder as mentioned above, characterized in that said modulus of longitudinal elasticity in the circumferential direction of the inner layer is 5,000 Kg/mm² or less and said outer layer has a modulus of longitudinal elasticity in the circumferential direction 8,000 Kg/mm² or more higher than that of said inner layer. In the carbon filament wound hollow cylinder of this invention, by virtue of the above characteristic feature, the residual stress produced due to the thermal expansion of a mandrel at the shaping step can be greatly reduced to prevent occurrence of interlaminar delamination, and when the carbon filament wound hollow cylinder is used as a rotary drum of a high speed rotary member, a compressive stress is generated among the layers by its centrifugal force and occurrence of interlaminar delamination by rotation can be effectively prevented.

Such materials as gypsum, water-soluble salts, low-melting-point alloys, water-soluble gypsum metals and the like may be used for formation of mandrels. Non-metallic materials are defective in that the surface hardness of a mandrel cannot be increased and the resulting mandrel is poor in dimension precision. A high dimension precision is mentioned as one characteristic property of carbon fiber reinforced plastics, and in the art of filament winding it is required to make the best use of the high dimension precision of carbon fibers. Accordingly, a metal mandrel having a high dimension precision is used for winding of carbon filaments. However, as is apparent from the data shown in Table 1, the linear thermal expansion coefficient of carbon fibers is greatly different from those of metals.

Table 1

Linear Thermal Expansion Coefficients of Carbon Fibers, Glass Fibers and Metal Materials for Formation of Mandrels

| | Linear Thermal Expansion Coefficient (20° C. - 40° C.) |
|---|---|
| Carbon Fibers | $-0.7 \times 10^{-6}$ |
| Glass Fibers | $5 \times 10^{-6}$ to $7 \times 10^{-6}$ |
| Steel | $16.5 \times 10^{-6}$ |
| Iron | $11.7 \times 10^{-6}$ |
| Titanium | $8.2 \times 10^{-6}$ |
| Vanadium | $7.8 \times 10^{-6}$ |

Accordingly, when resin-impregnated carbon fibers are wound on a metal mandrel and heated, since the linear thermal expansion coefficient of the metal is higher than that of the carbon fibers, the mandrel enlarges the cylinder formed by winding of the carbon filament, producing a field of tension.

In the case of isotropic materials, a great difference of the tension is not brought about between the inner surface layer and the outer surface layer of such cylinder. However, in the case of a filament wound cylinder composed of an anisotropic material, there is brought about a great difference between the value of tension of the inner surface layer and that of the outer surface layer. If the matrix resin is cured in such state and the mandrel is contracted, the stress is retained with a certain distribution to cause interlaminar delamination. This phenomenon, however, is not observed in glass fibers. The reason is that glass fibers are greatly different from carbon fibers in not only the linear thermal expansion coefficient but also the modulus of elasticity as shown in Table 2.

Table 2

Moduli of Elasticity of Carbon Fibers and Glass Fibers

| | Modulus of Elasticity (Kg/mm²) |
|---|---|
| Carbon Fibers | 22,000 – 38,000 |
| Glass Fibers | 7,000 |

The stress produced in correspondence with the displacement of a filament wound cylinder is, in the case of carbon fibers, as high as 3 to 5 times that in the case of glass fibers.

Further, the interlaminar strength of glass fibers is higher than that of carbon fibers, and in the case of glass fiber wound cylinders, interlaminar delamination is not caused even if the residual stress is produced due to the thermal expansion of a mandrel.

Moreover, since the anisotropy is higher in a carbon filament wound cylinder than in a glass filament wound cylinder, the difference of the stress caused by displacement of the mandrel between the inner and outer surfaces is greater in the carbon filament wound cylinder than in the glass filament wound cylinder, and therefore, a higher residual stress is produced in the carbon filament wound cylinder.

In view of the foregoing, in this invention, a layer of a winding angle giving a low modulus of elasticity in the circumferential direction and a low anisotropy in the section which is at right angle to the rotation axis is provided as the inner surface layer of a carbon filament wound cylinder, whereby the residual stress due to the thermal expansion of a mandrel can be reduced.

The invention will be better understood from the following description taken in connection with the accompanying drawings in which.

The essential feature of this invention will now be described in more detail by reference to mathematical formulae.

It is well known that mechanical properties of filament wound elements seen from the macroscopic viewpoint differ greatly from those seen from the microscopic viewpoint. The filament wound element will now be analysed as an elastic element which is anisotropic exhibits linear behaviors on the assumption that the thickness of individual filaments is as small as negligible as compared with the size of the element and the mechanical properties of the element vary depending on the direction of ordination of individual filaments.

In a axially symmetrical elastic element, the rotation axis is regarded as axis Z and polar coordinates in the radius and circumferential directions of its cross section are expressed as $r$ and $\theta$, respectively. Components of stress are expressed as $\sigma_r$, $\sigma_\theta$, $\sigma_z$, $\tau_{rz}$, $\tau_{r\theta}$ and $\tau_{\theta z}$ and $u$, $v$ and $w$ are used for components of displacement in the radial direction, the tangental direction and the direction of axis Z, respectively. In such cylindrical coordinate system, strain components are expressed as follows:

$$\epsilon_r = \frac{\delta u}{\delta r}, \epsilon_\theta = \frac{u}{r} + \frac{\delta v}{r\delta\theta}, \epsilon_z = \frac{\delta w}{\delta z}$$

$$\gamma_{r\theta} = \frac{\delta u}{r\delta\theta} + \frac{\delta v}{\delta r} - \frac{v}{r}, \gamma_{rz} = \frac{\delta u}{\delta z} + \frac{\delta w}{\delta r} \quad (1)$$

$$\gamma_{z\theta} = \frac{\delta v}{\delta z} + \frac{\delta w}{r\delta\theta}$$

Supposing that no force is imposed on the anisotropic elastic element, the following formulae for equilibrium condition can be derived if the equilibrium is considered among minute fractions of the anisotropic elastomeric element:

$$\frac{\delta\sigma_r}{\delta r} + \frac{1}{r}\frac{\delta\tau_{r\theta}}{\delta\theta} + \frac{\delta\tau_{rz}}{\delta z} + \frac{\sigma_r - \sigma_\theta}{r} = 0$$

$$\frac{\delta\tau_{rz}}{\delta r} + \frac{1}{r}\frac{\delta\tau_{\theta z}}{\delta\theta} + \frac{\delta\sigma_z}{\delta z} + \frac{\tau_{zr}}{r} = 0 \quad (2)$$

$$\frac{\delta\tau_{\theta r}}{\delta r} + \frac{1}{r}\frac{\delta\sigma_\theta}{\delta\theta} + \frac{\delta\tau_{\theta z}}{\delta z} + \frac{2\tau_{r\theta}}{r} = 0$$

Since the stress concerning the interlaminar delamination in a filament wound element is symmetric to the axis Z and is irrelevant to $\theta$ and shear components $\tau_{r\theta}$ and $\tau_{\theta z}$ disappear, the formulae (2) can be rearranged as follows:

$$\frac{\delta\sigma_r}{\delta r} + \frac{\delta\tau_{rz}}{\delta z} + \frac{\sigma_r - \sigma_\theta}{r} = 0$$

$$\frac{\delta\tau_{rz}}{\delta r} + \frac{\delta\sigma_z}{\delta z} + \frac{\tau_{rz}}{r} = 0 \quad (3)$$

The following formulae can be derived from formulae (1) as formulae indicating strain components in the axially symmetrical deformation:

$$\epsilon_r = \frac{\delta u}{\delta r}, \epsilon_\theta = \frac{u}{r}, \epsilon_z = \frac{\delta w}{\delta z}, \tau_{rz} = \frac{\delta u}{\delta z} + \frac{\delta w}{\delta r} \quad (4)$$

Supposing that a deformation on a given radius $r$ is constant with respect to the direction of axis Z, the following formula is derived:

$$\frac{\delta\sigma_r}{\delta r} + \frac{\sigma_r - \sigma_\theta}{r} = 0 \quad (5)$$

An axially symmetrical filament wound element can be treated as being two-dimensional. Accordingly, if the displacement in the radial direction is expressed by $u$, the strain component is formulated as follows:

$$\epsilon_r = \frac{\delta u}{\delta r}, \epsilon_\theta = \frac{u}{r}, \gamma_{r\theta} = 0 \quad (6)$$

Since the following formulae are derived from the above $$\frac{\delta\epsilon_r}{\delta r} = \frac{\delta^2 u}{\delta r^2}, \frac{\delta^2 u}{\delta r^2} = 2\frac{\delta\epsilon_\theta}{\delta r} + r\frac{\delta^2\epsilon_\theta}{\delta r^2}$$

the compatibility condition can be expressed as follows:

$$\frac{\delta \epsilon_r}{\delta_r} = 2 \frac{\delta \epsilon_\theta}{\delta_r} + r \frac{\delta^2 \epsilon_\theta}{\delta r^2} \quad (7)$$

If the anisotropy is taken into consideration, the relation between the strain and stress is expressed as follows:

$$\epsilon_r = \frac{1}{E_r}(\sigma_r - \nu_r \sigma_\theta), \quad \epsilon_\theta = \frac{1}{E_\theta}(\sigma_\theta - \nu_\theta \sigma_r) \quad (8)$$

wherein $E_r$, $E_\theta$, $\nu_r$ and $\nu_\theta$ stand for the modulus of elasticity in the radial direction, the modulus of elasticity in the circumferential direction, Poisson's ratio in the radial direction and Poisson's ratio in the circumferential direction, respectively.

If the stress is expressed as follows by using F for the stress function:

$$\sigma_r = \frac{1}{r} \frac{\delta F}{\delta_r}, \quad \sigma_\theta = \frac{\delta^2 F}{\delta r^2} \quad (9)$$

the equilibrium condition represented by the formula (3) is satisfied.

From the above formulae, the following formula can be derived:

$$\frac{\delta^4 F}{r^4} + \left(2 - \nu_\theta + \nu_r \frac{E_\theta}{E_r}\right) \frac{1}{r} \frac{\delta^3 F}{\delta r^3} - \frac{E_\theta}{E_r} \frac{1}{r^2}$$

$$\frac{\delta^2 F}{\delta r^2} + \frac{E_\theta}{E_r} \frac{1}{r^3} \frac{\delta F}{\delta_r} = 0 \quad (10)$$

This formula (10) can be rewritten as follows:

$$\frac{\delta^4 F}{\delta r^4} + a \frac{1}{r} \frac{\delta^3 F}{\delta r^3} + b \frac{1}{r^2} \frac{\delta^2 F}{\delta r^2} + c \frac{1}{r^3} \frac{\delta F}{\delta_r} = 0$$

wherein:
$a = 2 - \nu_\theta + E_\theta/E_r \cdot \nu_r$
$b = - E_\theta/E_r$, and
$c = E_\theta/E_r$ This 4-order ordinary differential equation can be transformed into a linear differential equation by effecting substitution of $r = e^t$, namely, the following formula can be derived:

$$\frac{d^4 F}{dt^4} + (a - 6) \frac{d^3 F}{dt^3} + (b - 3a + 11) \frac{d^2 F}{dt^2} +$$

$$(c - b + 2a - 6) \frac{dF}{dt} = 0$$

Accordingly, the solution of the formula (10) is as follows:

$$F = A r^{\lambda_1} + B r^{\lambda_2} + C r^2 + D \quad (11)$$

wherein $\lambda_1$ and $\lambda_2$ stand for the anisotropic characteristics which are given as the root of the following quadratic equation:

$$\lambda_{1,2} = \frac{1}{2}\left(2 + \nu_\theta - \frac{E_\theta}{E_r} \nu_r\right) \pm \frac{1}{2}$$

$$\sqrt{\left(2 + \nu_\theta - \frac{E_\theta}{E_r} \nu_r\right)^2 - 4\left(1 + \nu_\theta - \frac{E_\theta}{E_r}(\nu_r + 1)\right)} \quad (12)$$

A, B, C and D are integration constants determined by the boundary condition, and in the special case (in the case of the isotropic element) $\lambda_1$ is 0 and $\lambda_2$ is 2.

When the stress and strain components in the anisotropic element are obtained by substituting the formula (11) into the formulae (8) and (9), they are expressed by the following formulae, respectively:

$$\left.\begin{array}{l} \sigma_r = \frac{1}{r} \frac{\delta F}{\delta_r} = A\lambda_1 r^{\lambda_1 - 2} + B\lambda_2 r^{\lambda_2 - 2} + 2C \\ \\ \sigma_\theta = \frac{\delta^2 F}{\delta r^2} = A\lambda_1(\lambda_1 - 1) r^{\lambda_1 - 2} + B\lambda_2(\lambda_2 - 1) r^{\lambda_2 - 2} + 2C \end{array}\right\} (13)$$

and $$\left.\begin{array}{l} \epsilon_r = \frac{1}{E_r}(\sigma_r - \nu_r \sigma_\theta) = \frac{1}{E_r}\left[A\lambda_1\left(1 - \nu_r\right.\right. \\ \\ \left.\left.(\lambda_1 - 1)\right) r^{\lambda_1 - 2} + B\lambda_2\left(1 - \nu_r(\lambda_2 - 1)\right)\right. \\ \\ \left. r^{\lambda_2 - 2} + 2C(1 - \nu_r)\right] \\ \\ \epsilon_\theta = \frac{1}{E_\theta}(\sigma_\theta - \nu_\theta \sigma_r) = \frac{1}{E_\theta}\left[A\lambda_1(\lambda_1 - 1 - \right. \\ \\ \left. \nu_\theta) r^{\lambda_1 - 2} + B\lambda_2(\lambda_2 - 1 - \nu_\theta) r^{\lambda_2 - 2} \right. \\ \\ \left. + 2C(1 - \nu_\theta)\right] \end{array}\right\} (14)$$

These are related formulae with respect to an axially symmetrical anisotropic elastic element.

The residual stress exerted on a carbon filament wound cylinder due to a metal mandrel will now be described by using these related formulae.

Now, a carbon filament wound cylinder of one winding angle having an inner diameter $r_i$ and an outer diameter $r_o$ is considered. The symbol $\alpha$ is used to mean the difference of the thermal expansion coefficient in the circumferential direction between the mandrel and carbon filament wound cylinder. In this case, the following boundary conditions are obtained:

$r = r_i : (\epsilon_\theta)r = r_i = -\alpha$
$r = r_o : (\sigma_r)r = r_o = 0$ The following relation can be derived from the formulae (13) and (14):

$$(\epsilon_\theta)r = r_i = \frac{1}{E_\theta}\left[A\lambda_1(\lambda_1 - 1 - \nu_\theta) r_i^{\lambda_1 - 2}\right.$$

$$\left. + 2C(1 - \nu_\theta)\right] = -\alpha$$

$$(\sigma_r)r = r_o = A\lambda_1 r_o^{\lambda_1 - 2} + 2C = 0$$

Accordingly, the following equations are derived:

$$A = \frac{E_\theta \cdot \alpha}{\lambda_1} \cdot \frac{1}{(1-\nu_\theta)r_o^{\lambda_1-2} - (\lambda_1 - 1 - \nu_\theta)r_i^{\lambda_1-2}}$$

$$C = -\frac{E_\theta \cdot \alpha}{2} \cdot \frac{r_o^{\lambda_1-2}}{\left\{(1-\nu_\theta)r_o^{\lambda_1-2} - (\lambda_1 - 1 - \nu_\theta)r_i^{\lambda_1-2}\right\}}$$

Therefore, the stress is expressed as follows:

$$\sigma_4 = \frac{E_\theta \cdot \alpha}{(1-\nu_\theta)r_o^{\lambda_1-2} - (\lambda_1 - 1 - \nu_\theta)r_i^{\lambda_1-2}} \cdot r_o^{\lambda_1-2}$$

$$- \frac{E_\theta \cdot \alpha}{\left\{(1-\nu_\theta)r_o^{\lambda_1-2} - (\lambda_1 - 1 - \nu_\theta)r_i^{\lambda_1-2}\right\}} \cdot r_o^{\lambda_1-2}$$

$$\sigma_\theta = \frac{E_\theta \cdot \alpha}{(1-\nu_\theta)r_o^{\lambda_1-2} - (\lambda_1 - 1 - \nu_\theta)r_i^{\lambda_1-2}} \cdot (\lambda_1 - 1)r^{\lambda_1-2} -$$

$$\frac{E_\theta \cdot \alpha}{\left\{(1-\nu_\theta)r_o^{\lambda_1-2} - (\lambda_1 - 1 - \nu_\theta)r_i^{\lambda_1-2}\right\}} \cdot r_o^{\lambda_1-2}$$

(15)

The distribution of the stress exerted, due to thermal expansion of the mandrel, on the carbon filament wound cylinder can be calculated by using the above equation.

Figure 3:
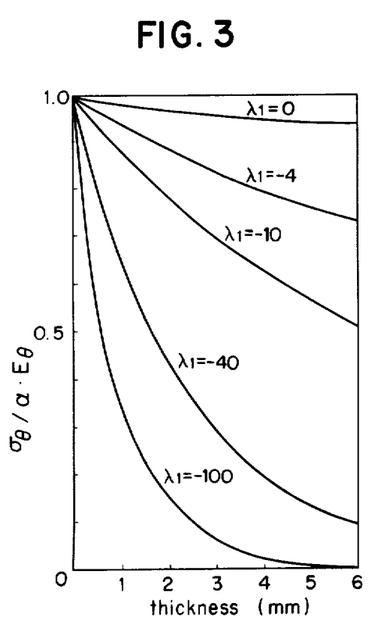
FIG. 3 is a diagram showing distribution of stresses exerted on an uncured filament material due to thermal expansion of a mandrel employed for shaping of the present filament wound cylinder.

Results of the calculation made on a carbon filament wound cylinder having an inner diameter of 200 mm and a thickness of 6 mm are shown in FIG. 3. In FIG. 3, the abscissa indicates the thickness, and the origin on the abscissa indicates the inner surface layer and the point of 6 mm on the abscissa shows the outer surface layer. The ordinate indicates the ratio of the tensile stress of each point in the cylinder to the tensile stress of the inner surface layer. $\lambda_1$ shows the degree of anisotropy. The value of $\lambda_1 = 0$ indicates complete isotropy. The lower the value of $\lambda_1$, the higher is the degree of anisotropy.

From FIG. 3, it will readily be understood that a higher degree of anisotropy results in a greater difference of the stress between the inner surface and the outer surface, and that the absolute value of the difference of the stress becomes greater as the elasticity modulus $E_\theta$ in the circumferential direction of the filament wound cylinder and the thermal expansion difference $\alpha$ are greater.

On curing of the resin the stress is retained with a certain distribution and this stress distribution causes interlaminar delamination.

In case glass fibers are wound on a metal mandrel, the interlaminar delamination does not occur, because the $\lambda_1$ value of glass fibers is greater than that of glass fibers and both the $E_\theta$ and $\alpha$ values are smaller.

The method for reducing the residual stress in the carbon filament wound cylinder will now be described.

From FIG. 3, it will be first of all considered that the residual stress may probably be reduced by lowering the value $\alpha$. However, this method is not applicable, because the reduction of the value $\alpha$ is limitative as seen from FIG. 1. Even if the mandrel is made of a material which can render the value $\alpha$ small, it is very difficult to release the wound cylinder from such mandrel after heat-curing of the resin. Thus, a method reducing the value $E_\theta$ can be considered instead. The value $E_\theta$ can be made smaller by reducing the winding angle. If the winding angle is reduced, the value of $\lambda_1$ indicating the degree of anisotropy in the $r$-$\theta$ plane will naturally approximate zero and hence, the difference of the stress between the inner and outer surfaces becomes small.

From the foregoing, it is confirmed that a lower modulus of elasticity in the circumferential direction results in a lower residual stress.

In FIG. 3, in case the value of $\lambda_1$ is small, the gradient of the stress distribution in the vicinity of the inner surface layer is steep and the residual stress is high. Thus, it is apparent that in a carbon filament wound cylinder comprising at least two layers differing in the winding angle, in which mechanical characteristics are required in the circumferential direction and the axial direction, the residual stress produced due to the thermal expansion of a mandrel can be reduced by providing an inner surface layer having a lower modulus of elasticity in the circumferential direction than the modulus of elasticity of an outer surface layer in the circumferential direction.

Figure 1A:
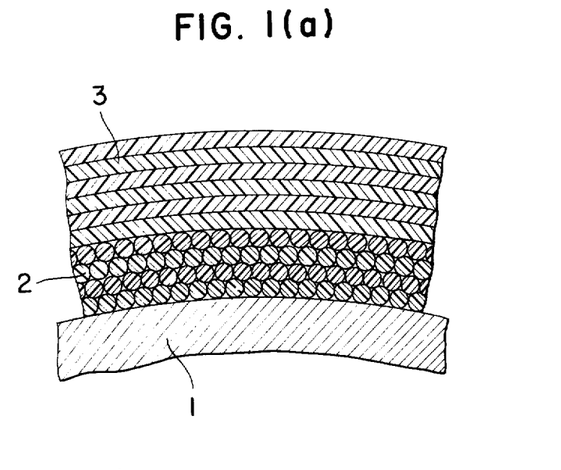
FIG. 1(a) is a fragmentary cross sectional view illustrating one mode of method of making a carbon filament wound cylinder according to the present invention.
Figure 1B:
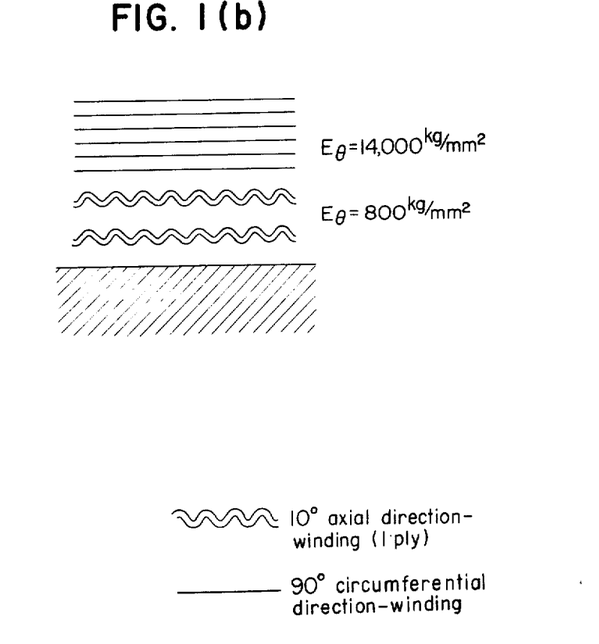
FIG. 1(b) is a diagrammatic view of the method shown in FIG. 1(a)
Figure 4:
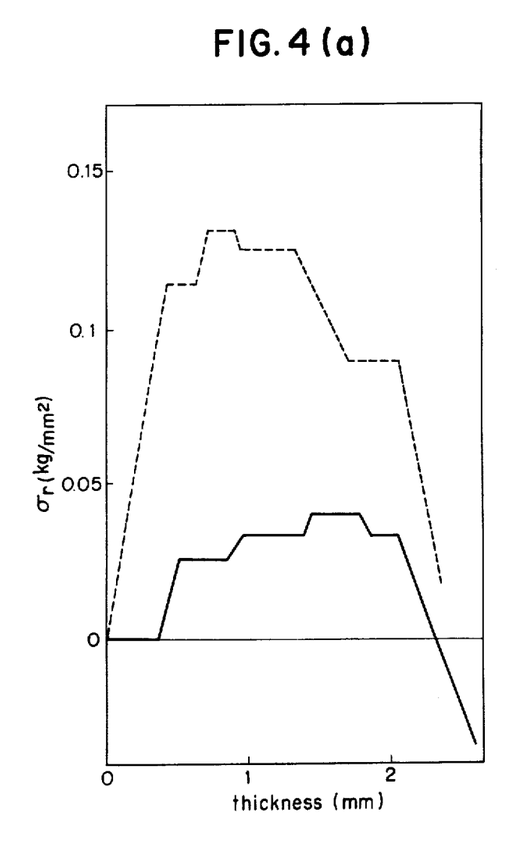
FIG. 4(a) is a diagram showing a result of the measurement of residual stresses of the carbon filament wound cylinder shown in FIG. 1 and a conventional filament wound cylinder having a sandwitch type layer structure shown in FIG. 4(b)

FIGS. 1(a) and 1(b) illustrate one preferred embodiment of the present invention, wherein two resin-impregnated carbon filament wound layers 2 and 3 are formed on a mandrel 1. A carbon fiber employable in the present invention is for example "TORAYCAT-300A" (tensile strength: 250 kg/mm² tensile modulus elasticity: 22,000 kg/mm²; density: 1,73 g/cm³; unit yarn number: 3,000; sizing: applied) manufactured and sold by TORAY KABUSHIKI KAISHA. A resin composition employable in the present invention is formulated, for example, of a bisphenol-A epoxy resin, e.g. DER 332 (100.0 parts by weight) trade name of epoxy resin manufactured and sold by DOW CHEMICAL), a curing agent, e.g. MHAC-P (103.0 parts by weight) (trade name of the agent manufactured and sold by HITACHI CHEMICAL CO., LTD.) and a curing accelerator, e.g. EMI-24 (0.8 parts by weight) (trade name of the accelerator manufactured and sold by SHIKOKU KASEI KABUSHIKI KAISHA). The filament would layer 2 is formed by an in-plane winding or axial direction-winding to provide an innermost surface layer having a contact with said mandrel 1 and the filament wound layer 3 is formed on said layer 2 by a hoop winding or circumferential direction-winding to make a base filament layer laminate as shown in FIGS. 1 (a) and 1 (b). The term "axial direction-winding" used herein means a winding with a winding angle of 20° or less, preferably 5° to 15° and most suitably from a practical view point about 10° with respect to the axis of the cylinder and the term "circumferential direction-winding" means a winding with a winding angle of 80° to 90° with respect to the axis of the cylinder. Thus, the mechanical characteristics can be manifested in both the axial and circumferential directions and the residual stress can be reduced. Illustratively stated, in the thus constructed filament wound cylinder, the moduli of longitudinal elasticity of these layers 2 and 3 in the circumferential direction are selected so as to be increased towards the outside of the filament laminate structure, to wit, the outer layer 3 is designed to have a modulus of longitudinal elasticity in the circumferential direction higher than the inner layer 2, to effectively reduce the residual stress, as is clearly seen from FIG. 4(a). In this connection, it is to be noted that the modulus of elasticity of the inner layer 2 in the circumferential direction is to be selected so as to be 5,000 Kg/mm² or less and the difference between the moduli of elasticity of the inner and the outer layers 2 and 3 is selected so as to be 8,000 Kg/mm² or more. For example, in a preferred embodiment of the present invention, the inner layer 2 of in-plane or axial direction-winding is designed to have an elasticity modulus of 800 Kg/mm² in the circumferential direction and the outer layer 3 of hoop or circumferential direction-winding is designed to have an elasticity modulus of 14,000 Kg/mm² in the circumferential direction.

In case the carbon filament wound cylinder of the present invention is employed as a rotary drum of ultracentrifugalization, for example, for separation of $U_{235}$ from $U_{238}$, the layer of circumferential direction-winding is preferably 50% by weight or more based upon the total weight of the filament wound into the cylinder for the following reason. That is, the rotary drum for such a ultracentrifugalization is rotated generally at a peripheral velocity of about 380 to 420 m/sec. and therefore required to have a tensile strength of at least about 23 to 27 Kg/mm² and preferably 80 Kg/mm² in view of safety problem, and the 10° axial direction-winding has a tensile strength of about 3 Kg/mm² while 90° circumferential direction-winding has a tensile strength of 140 Kg/mm².

Figure 2:
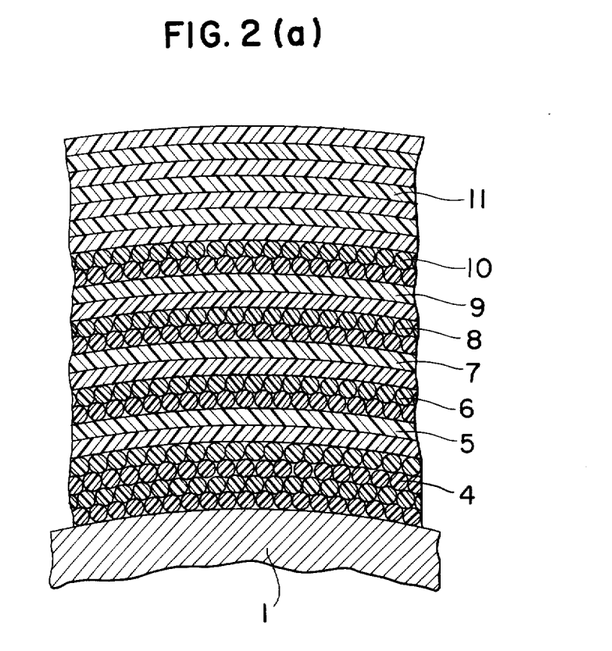
FIG. 2(a) is a similar fragmentary cross sectional view illustrating another mode of method of making a carbon filament wound cylinder according to the present invention.
FIG. 2(b) is a diagrammatic view of the method shown in FIG. 2(a)

The carbon filament wound cylinder of the present invention is formed ordinarily according to the following process:

FIGS. 2(a) and 2(b) illustrate another embodiment of this invention, in which a plurality of filament layer laminate, each of which is composed of an inner layer and an outer layer, are wound on a mandrel so that the moduli of elasticity of these filament layer laminates in the circumferential direction are increased toward the outside of the composite laminate layer structure. More specifically, the average modulus of elasticity in the circumferential direction of an innermost filament layer laminate having a contact with the mandrel 1, which is composed of inner and outer layers 4 and 5 identical with the base filament layer laminate specified in the embodiment of FIGS. 1(a) and 1(b), is lower than the average modulus of elasticity in the circumferential direction of a next layer laminate composed of inner and outer layers 6 and 7, which has an average modulus of elasticity in the circumferential direction same as that of a layer laminate composed of inner and outer layers 8 and 9. The average modulus of elasticity in the circumferential direction of this filament layer laminate is lower than that of an outermost filament layer laminate composed of inner and outer layers 10 and 11. In the embodiment of FIGS. 2(a) and 2(b), each component layer laminate has a 10° in-plane or axial direction-winding layer as the inner layer and a 90° hoop or circumferential direction-winding layer as the outer layer, and the feature that the moduli of longitudinal elasticity of such component layer laminates in the circumferential direction are increased toward the outside can be attained by changing the ratio of the thickness $t$ of the outer layer to the thickness $t$ of the inner layer in these component layer laminates so that the following relation is established:

$$\frac{t_5}{t_4} < \frac{t_7}{t_6} < \frac{t_9}{t_8} < \frac{t_{11}}{t_{10}}$$

in which each suffix indicates the layer number in FIG. 2. The ratio of the filament weight of the outer layer to the filament weight of the inner layer in each laminate is at least equal to the ratio in the next inner layer and the ratio in the innermost laminate being lower than that in the outermost laminate; weight and thickness are of course directly proportional. Of course, similar results can be obtained by changing the winding angle in these layers instead of changing the thickness $t$ in the above manner as is clearly seen from FIGS. 7 and 8.

In case the thus constructed filament wound cylinder having a plurality of filament layer laminates is used as a rotary drum for ultracentrifugalization, filament of hoop circumferential direction-winding is 50% by weight or more in total, based on the total weight of the filament wound into the cylinder.

By referring to the formulae (1) to (15), the residual stress exerted on a filament wound element has been illustrated to prove effectiveness of this invention. Now, results of actual measurements of the residual stress will be described.

Figure 5A:
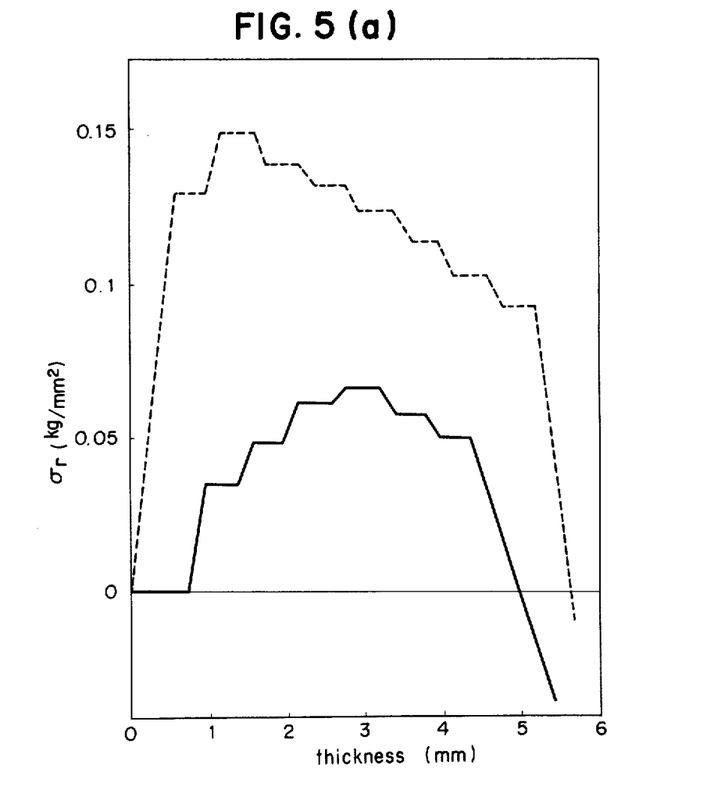
FIG. 5(a) is a similar diagram showing a result of the measurement of residual stresses of the carbon filament wound cylinder shown in FIG. 2 and a conventional filament wound cylinder having a layer structure shown in FIG. 5(b)
Figure 5B:
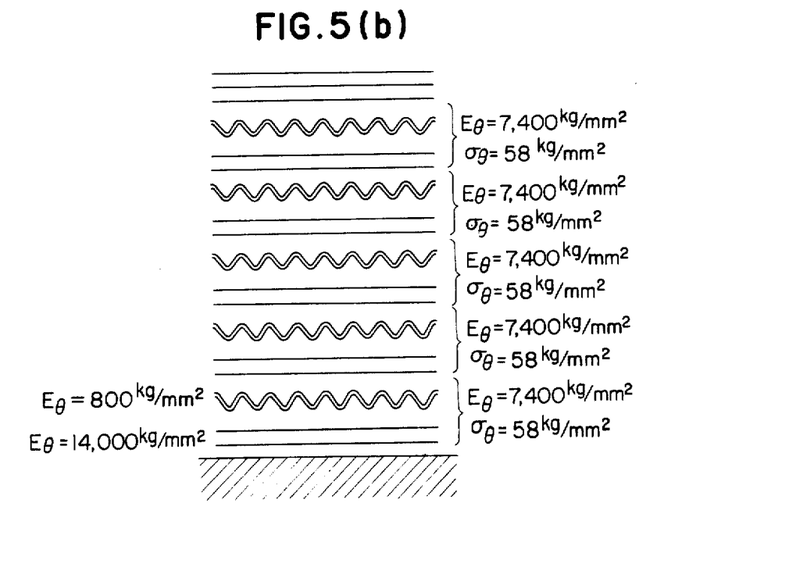

FIG. 5(a) is a diagram showing the results of the measurement of the residual stress in the radius direction made on a carbon filament wound cylinder of this invention shown in FIGS. 2(a) and 2(b) and a conventional carbon filament wound cylinder as shown in FIG. 5(b).

In the diagram, the broken line indicates data obtained with respect to the conventional carbon filament wound cylinder and the solid line indicates data obtained with respect to the carbon filament wound cylinder of this invention. In FIG. 5(a), the origin of the abscissa indicates the inner surface of the carbon filament wound cylinder having an inner diameter of 200 mm, and the ordinate indicates the stress in the radius direction, a positive value showing the tensile stress causing interlaminar delamination and a negative value showing the compressive stress. The measurement of the residual stress is conducted in the following manner:

A ring having a width of 10 mm is cut out of the carbon filament wound cylinder, and strain gauges are applied to 4 points on the inner and outer peripheries of the ring to read amounts of distortion on the inner and outer surfaces before and after cutting. Then, the innermost layer is peeled from the ring and the amount of distortion is read at this point to determine the stress in the radial direction. Then, each layer is peeled from the inside and the residual stress is similarly determined.

From the data shown in the diagram, it is apparent that in the case of the conventional carbon filament wound cylinder having an inner surface layer formed by ordinary hoop or circumferential direction-winding, the maximum residual stress $\sigma_r$ in the radial direction is 0.147 Kg/mm² at a point close to the inner surface, whereas in the carbon filament wound cylinder of this invention shown in FIG. 2(a), the maximum residual stress in the radial direction is 0.067 Kg/mm², which is lower than ½ of the maximum residual stress in the conventional carbon filament wound cylinder. The effectiveness of this invention has thus been proved.

The advantages of the carbon filament wound cylinder having a plurality of component filament layer laminates as shown in FIGS. 2(a) and 2(b) are: (1) thermal stress exerted due to elevation of the temperature during operation is effectively dispersed than in the filament wound cylinder having a single filament layer laminate because, such thermal stress is concentrated to the laminar interface; and (2) in use for ultracentrifugalization for separation of $U_{235}$ from $U_{238}$, possible leakage of $UF_6$ used for such separation is more effectively prevented than the filament wound cylinder of single filament layer laminate.

Carbon filament wound cylinders are frequently used as rotary drums for ultracentrifugalization. In general, if a residual stress is present in such rotary drum, interlaminar delamination is caused during ultracentrifugalization or by the temperature increase during the ultracentrifugalization and hence, the balance is lost in the rotary drum and it is broken. Accordingly, the presence of the residual stress is a serious problem in rotary drums for ultracentrifugalization. Therefore, when the carbon filament wound cylinder of this invention is used as a rotary drum for the ultracentrifugalization, it is very advantageous with respect to the residual stress formed at the shaping step and the stress exerted by centrifugal force on ultracentrifugalization. The effectiveness of the carbon filament wound cylinder of this invention attained when it is used as a rotary drum for the ultracentrifugalization will now be described more detailedly.

In conventional filament wound cylinders used as rotary drums for high speed rotating members e.g. for ultracentrifugalizer, the innermost layer is formed by winding filaments in the circumferential direction. If such innermost layer is provided, on mechanical processing of the inner face of a rotary drum element formed from this multi-layer filament wound cylinder or composite filament laminate layer structure, the direction of cutting or grinding is in agreement with the direction of the filament ordination and hence, a smooth finish surface can be attained. However, in the case of such cylinder including an innermost layer formed by winding filaments in the circumferential direction, a large residual stress is exerted. When high speed rotation is conducted at a high temperature for a long time, interlaminar delamination is caused and the balance is lost in the rotating member. As a result of this vibration becomes violent and finally the rotating member is broken. Further, as regards the distribution of the stress exerted in layers of the filament wound cylinder caused by centrifugal force generated at high speed rotation, in the case of a cylinder including a hoop wound innermost layer having a high modulus of longitudinal elasticity in the circumferential direction, a tensile stress is generated in the radial direction and this tensile stress is added to the above-mentioned residual stress exerted at the shaping step, and therefore, interlaminar delamination is more readily caused to occur. This fact will be described below more detailedly.

In a rotary drum for a high speed rotating member which has a layer structure in which an innermost layer is formed by hoop or circumferential direction winding, the next layer is formed by in-plane winding, layers formed by hoop winding and layers formed by in-plane winding are disposed alternately and an outermost layer is formed by hoop winding, when $t_i$ is used for the thickness of the in-plane wound layer and $t_h$ is used for the thickness of the hoop wound layer, supposing that the inner diameter of the cylinder is sufficiently larger than the thickness, the stress in the radial direction generated between the adjacent in-plane wound layer and hoop wound layer is expressed by the following formula:

$$\sigma_r = \frac{\left(\frac{\gamma}{E_i} - \frac{\gamma}{E_h}\right)\frac{v^2}{g}}{\frac{d}{2}\left(\frac{1}{E_h \cdot t_h} + \frac{1}{E \cdot t_i}\right)} \tag{16}$$

wherein $\sigma_r$ is the stress in the radial direction generated between the layers upon rotation, $E_h$ and $E_i$ are modulus of longitudinal elasticity in the radial direction of the inner and outer layers, $\gamma$ stands for the specific gravity, $v$ designates the peripheral speed of the cylinder, $g$ stands for acceleration of gravity, $d$ is the diameter of the cylinder, and $t_h$ and $t_i$ designate the thicknesses of the inner and outer layers, respectively. If the above symbols have the following values, the stress $\sigma_r$ in the direction causing interlaminar direction is 0.522 Kg/mm²:

$E_h = 14,000$ Kg/mm²
$E_i = 4,000$ Kg/mm²
$\gamma = 1.60 \times 10^{-6}$ Kg/mm³
$g = 9.8 \times 10^3$ mm/sec²
$d = 200$ mm
$t_h = 1.0$ mm
$t_i = 6.0$ mm
$V = 450$ m/sec As is apparent from the foregoing, if a hoop wound layer is used as an inner layer, a stress is exerted in the direction causing interlaminar delamination, and there is a great possibility of occurrence of interlaminar delamination.

By contrast, in the laminate layer structure of this invention, the arrangement of the inner and outer layers is quite contrary to that mentioned above, and therefore, the above formula (16) has a negative value. In other words, the stress exerted is one in the compressive direction not causing interlaminar delamination.

In forming a multi-layer structure comprising a plurality of filament layer laminates, each of which is composed of an inner layer and an outer layer, from the foregoing description, it will readily be understood that if the modulus of longitudinal elasticity in the circumferential direction is increased toward the outside, the sum of the stress in the interlaminar delamination-causing direction formed at the shaping step and the stress in the interlaminar delamination-causing direction exerted on rotation is reduced.

The foregoing illustration has been made by reference to very simple models. More specific instances will now be described.

Recently, the finite element method has been developed as effective means for analysis of the stress. The finite element method is one of numerical experiments, and the calculation results obtained according to this method are well in agreement with the actual state.

Figure 6A:
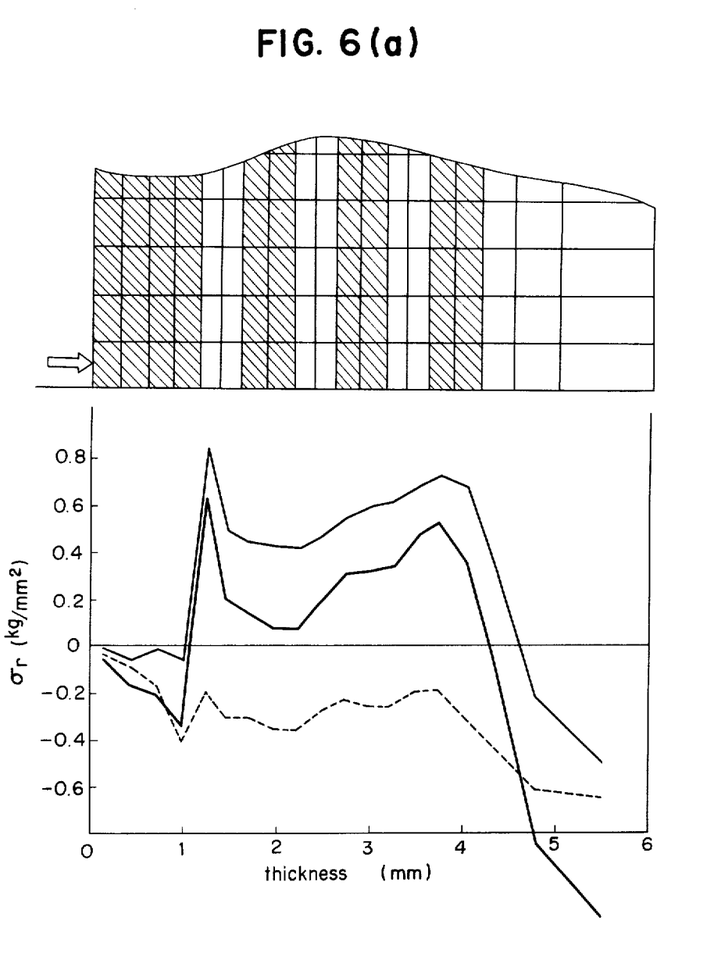
FIG. 6(a) is a diagram showing results of the stress analysis made on the cylinder shown in FIG. 2 according to the finit element method.

FIG. 6(a) illustrates results obtained by analyzing the carbon filament wound cylinder of the present invention, according to the finite element method.

In FIG. 6(a), the upper diagram is a mesh division diagram, in which the slant line area corresponds with the 10° in-plane wound layer and the other blank area corresponds with the 90° hoop wound layer. The severest stress is imposed on the end portion in a rotary drum for a high speed rotation member. Accordingly, the stress in the radial direction in the plane which is at right angle to the rotation axis, indicated by arrows in the upper diagram of FIG. 6(a) is plotted on the diagram shown in the lower portion of FIG. 6(a) to examine the stress at this end portion. In the diagram of FIG. 6(a) the origin of the abscissa indicates the inner surface layer (having a diameter of 200 mm) at the end portion of the rotary drum, and the point of 6 mm indicates the outer surface layer at the end portion of the rotary drum. The ordinate indicates the stress $\sigma_r$ in the radial direction. The positive value shows a tensile stress acting in the direction causing interlaminar delamination and the negative value shows a compressive stress not causing interlaminar delamination. In the diagram, the broken line indicates the stress formed when the rotary drum is rotated at a peripheral velocity of 400 m/sec. From the results shown in FIG. 6(a), it will readily be understood that in the laminate layer structure of this invention, a compressive stress is exerted and no interlaminar delamination is caused to occur.

In the diagram of FIG. 6(a), a thinner solid line indicates the stress distribution observed when the temperature is elevated by 60° C. It is seen that a stress is exerted in the interlaminar delamination-causing direction at this elevated temperature. Such thermal stress cannot be avoided when layers differing in the thermal expansion coefficiency are laminated. In case mechanical characteristics are required in both the axial direction and circumferential direction and layers differing in the winding angles are laminated, it is difficult to reduce occurrence of such thermal stress. Therefore, in order to prevent occurrence of interlaminar delamination, it is desired that such a compressive stress as will cancel the thermal stress is exerted by rotation. In this case, it is also important that the residual stress exerted at the shaping step is low. As is seen from the thicker solid line of the diagram of FIG. 6(a) showing the synthesis of the broken line and thinner solid line, namely, the stress distribution observed when the temperature is elevated by 60° C. and the rotary drum is rotated at 400 m/sec, in the laminate layer structure of this invention, the compressive stress exerted by rotation acts to cancel or reduce the thermal stress.

Figure 6B:
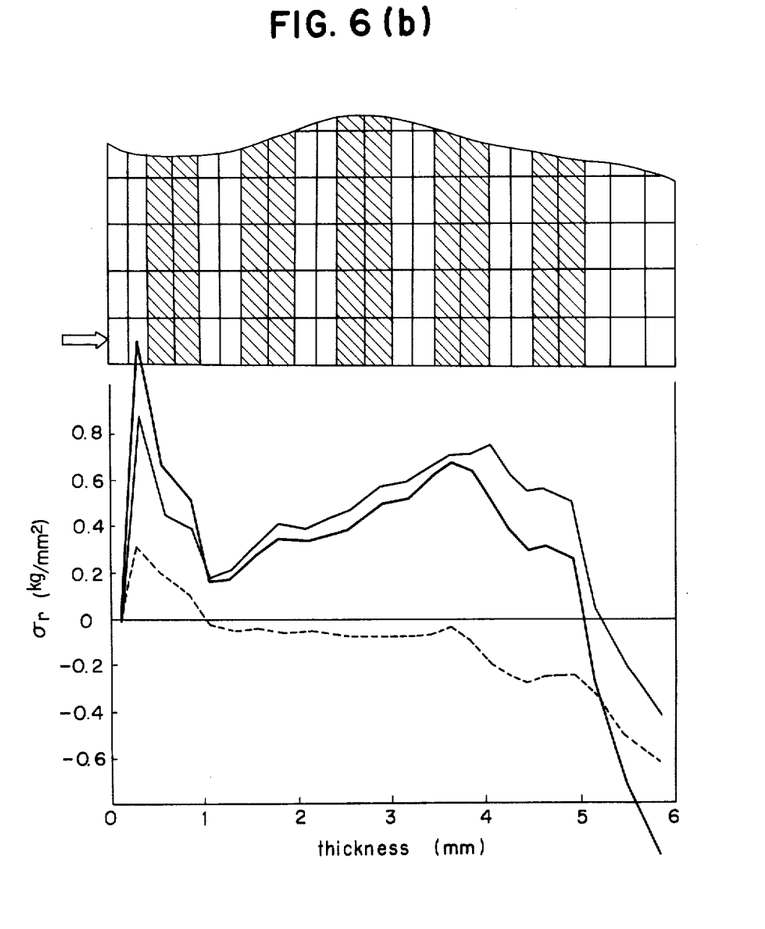
FIG. 6(b) is a diagram showing results of the stress analysis made on the conventional cylinder shown in FIG. 5(b)
Figure 7:
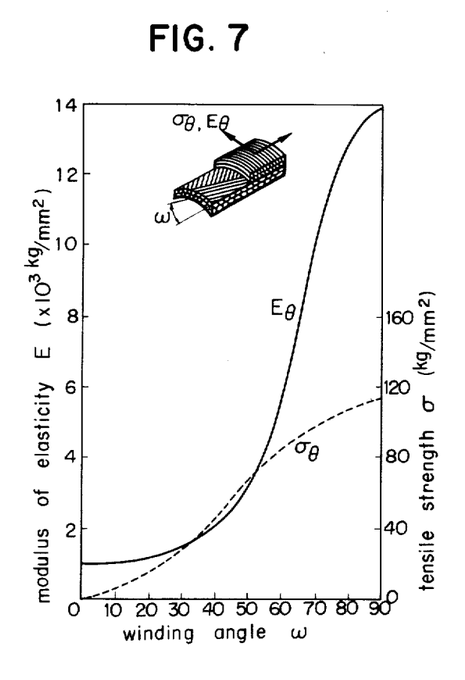
FIG. 7 is a diagram showing relationships between a winding angle of the filament and tensile strength and modulus of elasticity of the filament layer.
Figure 8:
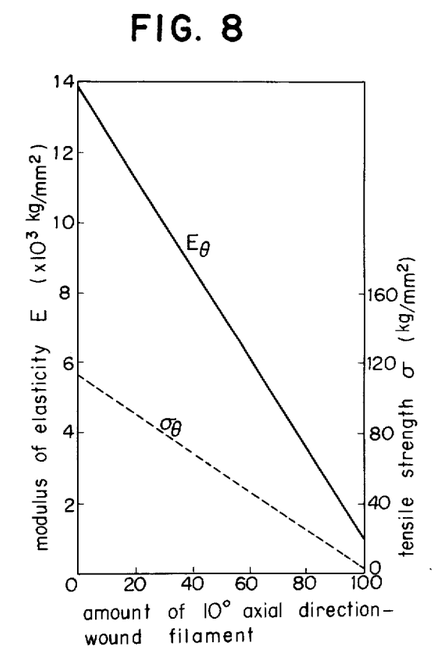
FIG. 8 is a diagram showing relationships between an amount of 10° axial direction-wound filament in a filament laminate layer structure of the present invention in which 10° axial direction-wound filament and 90° circumferential direction wound filament are employed and tensile strength and modulus of elasticity of the filament laminate layer structure.

FIG. 6(b) similarly illustrates results obtained by analysis of the conventional carbon filament wound cylinder having a layer structure of FIG. 5(b), according to the finite element method. In the diagram of FIG. 6(b), the thicker solid line apparently shows an interlaminar delamination at the inner portion of the cylinder.

The effect of the present invention for eliminating an undesirable stress to cause an interlaminar delamination can be further will substantiated by the following comparative experiments between the rotary drum for ultracentrifugalization according to the present invention and the conventional rotary drum for ultracentrifugalization.

When the conventional rotary drum having a layer structure of FIG. 5(b) was operated at a peripheral velocity of 380 m/s, at 80° C. for 28 hours, the rotary drum was subjected to a violent vibration and could not be recovered to its normal condition after repairment. Upon dismantlement of the rotary drum, an interlaminar delamination was seen at the innermost layer.

Even before use for ultracentrifugalization, it was detected by color check or a supersonic flaw detector that 40% of the product of the conventional filament wound cylinder had cracks (interlaminar delamination).

Whereas, when the rotary drum of the present invention as shown in FIG. 2(a) is operated at a peripheral velocity of 380 m/sec, at 80° C. for 300 hours, no abnormality was seen.

In the filament wound cylinders just shaped according to the present invention, there was found no cracks (interlaminar delamination) by means of color check and supersonic flaw detector.

According to this invention, the modulus of longitudinal elasticity in the circumferential direction of the inner layer is always kept lower than in the outer layer, and in the case of an element including a plurality of filament layer laminates each of which is composed of inner and outer layers, in each filament laminate layer the modulus of longitudinal elasticity in the circumferential direction in the inner layer is always kept lower than in the outer layer. By virtue of this feature, the residual stress due to thermal expansion of the mandrel can be greatly reduced, and when the cylinder of this invention is used for a rotary drum for a high speed rotating member, all of the force acting on between every two adjacent layers is transformed into a compressive force by the centrifugal force on rotation; therefore, the rotary drum can be rotated stably without interlaminar delamination. Accordingly, great advantages are attained by this invention.

What is claimed is:

1. A hollow cylinder suited for use as the rotary drum of an ultracentrifuge comprising a plurality of superposed laminates each comprising resin-impregnated carbon filaments, each laminate comprising an inner filament layer and an outer filament layer, the filaments in the inner filament layers being arranged at an angle of 0° to 20° with reference to the axis of the cylinder and the filaments in the outer layers being arranged at an angle of 80° to 90° with reference to the axis of the cylinder, the ratio of the filament weight of the outer layer to the filament weight of the inner layer in each laminate being at least equal to the ratio in the next inner laminate and the ratio in the innermost laminate being lower than that in the outermost laminate, the modulus of longitudinal elasticity in the circumferential direction of the inner layer of each laminate being 5000 Kg/mm$^2$ or less and the modulus of longitudinal elasticity in the circumferential direction of the outer layer of each laminate being at least 8000 Kg/mm$^2$ higher than that of the respective inner layer, each subsequent laminate having an average modulus of elasticity equal to or greater than the inner laminate.

* * * * *